Patented Dec. 1, 1936

2,062,957

UNITED STATES PATENT OFFICE 2,062,957

PROCESS OF PREPARING ALIPHATIC SULPHO-ETHERS

Alfred William Baldwin, Ashton-on-Mersey, and Anthony James Hailwood, Altrincham, England, assignors to Imperial Chemical Industries Limited, a corporation of Great Britain No Drawing. Application May 6, 1932, Serial No. 609,768. In Great Britain May 16, 1931

1 Claim. (Cl. 260—151)

This invention relates to chemical compounds, more particularly substances exhibiting in a pronounced degree the properties of wetting, detergent, foaming and dispersive agents, and a process for the manufacture thereof.

As is well known, ordinary wetting agents and detergents such as soaps, i. e., the alkali metal salts of the fatty acids, are of little or no value for use in acidic solutions because the water-soluble alkali metal salts are converted into the water-insoluble fatty acids. Furthermore, soaps are precipitated in hard water by salts of calcium, magnesium and the like.

It is an object of the present invention to produce new substances which possess wetting, detergent, foaming and dispersive properties in acid solutions and hard water. A further object is the production of compounds which do not suffer decomposition by the action of hydrolytic agencies. A still further object is the provision of a new and improved process for producing products of the character above described. Other objects will appear hereinafter.

These objects are accomplished according to the present invention by combining a long chain saturated or unsaturated aliphatic radical and a B-sulphoethyl group by means of an ether link to produce compounds having the general formulae I            R—O—CH$_2$—CH$_2$—SO$_3$H
             or
II           R—O—CH$_2$—CH$_2$—SO$_3$M in which R represents a long chain, saturated or unsaturated aliphatic radical containing not less than six carbon atoms and M represents an alkali metal. The process of the invention may be carried out by reacting an alkali metal alkoxide having the formula

R—O—M wherein R and M have the foregoing signification, with an alkali metal B-halogen-ethanesulphonate, the resultant product being the alkali metal salt of the sulpho-acid represented by Formula II. The reaction is preferably effected in a solvent or suspension medium. The free sulphoacid may be formed from its alkali metal salt in any suitable manner, e. g., by treatment with a dilute mineral acid.

While the invention is susceptible of considerable variation and modification in the manner of its practical application, particularly as regards the nature and proportions of materials employed and the exact method of procedure, the following examples, in which the parts are by weight, will illustrate some of the products falling within the invention and how they may be prepared.

Example I

Nine and one-half parts of dodecyl alcohol are dissolved in 50 parts of xylene and the solution is boiled under reflux with 2.3 parts of finely ground sodamide until ammonia ceases to be evolved. Twelve parts of sodium B-bromoethanesulphonate, in a finely divided state, is added and refluxing is continued with vigorous agitation for 15 hours. The xylene is then removed by distillation under reduced pressure. The residue is a stiff pasty mass. It is freely soluble in water and may be freed from impurities if desired by dissolving in water and salting out.

Example II

Twelve and one-tenth parts of cetyl alcohol are dissolved in 50 parts of xylene and the solution is boiled under reflux with 2.3 parts of finely ground sodamide until ammonia ceases to be evolved. Twelve parts of sodium B-bromoethane sulphonate, in a finely divided state, are added and refluxing is continued with vigorous agitation for 15 hours. The xylene is then removed by distillation under reduced pressure. The residue resembles that of Example I and the product is purified, if desired, in a similar way.

Example III

Thirteen and four-tenths parts of oleyl alcohol are dissolved in 50 parts of xylene and the solution is boiled under reflux with 2.3 parts of finely ground sodamide until ammonia ceases to be evolved. Twelve parts of sodium B-bromoethanesulphonate, in a finely divided state, is added and refluxing is continued with vigorous agitation for 15 hours. The xylene is then removed by distillation under reduced pressure. The residue resembles that of Example I and is similarly treated.

A similar compound is obtained when instead of 13.4 parts of oleyl alcohol, 13.5 parts of octadecyl alcohol is used. Instead of sodium B-bromo-ethanesulphonate, sodium B-chloro-ethanesulphonate may be employed.

It will be understood that the invention is not limited by the above examples. The products may be any compounds having the general formula

III          R—O—CH$_2$—CH$_2$—SO$_3$X in which R represents a saturated or unsaturated aliphatic radical containing at least six carbon atoms and X represents hydrogen or an alkali metal (preferably potassium or sodium). The radical R may have a straight or branched chain. In general, it is preferable that R be a long chain, saturated or unsaturated alkyl radical containing more than about ten carbon atoms such as, for example, dodecyl, cetyl, oleyl, and the like radicals.

The aliphatic alcohols employed as starting materials in accordance with the process of the invention may be those contained in wool-fat, or those obtained from other natural sources, e. g., stearyl alcohol (octadecyl alcohol), cetyl alcohol (hexadecyl alcohol), ceryl alcohol and myricyl alcohol. They may also be such, e. g., dodecyl alcohol (lauryl alcohol) as are now obtainable by reduction of esters of the corresponding fatty acids. Synthetic higher alcohols, for example, those obtained by the hydrogenation of carbon oxides under elevated temperatures and pressures may also be employed. The process is likewise applicable to the treatment of mixtures of any of the foregoing alcohols, e. g., complex mixtures of synthetic alcohols boiling above about 160° C. and, in general, to the treatment of any alcohols containing six or more carbon atoms.

As will be apparent by the foregoing description of the products with reference to Formula III, the alcohols preferably employed are the aliphatic monohydric alcohols of the saturated series containing ten or more carbon atoms such as, for example, dodecyl alcohol, cetyl alcohol, octadecyl alcohol and myricyl alcohol; or of the unsaturated series, such as, for example, linalool, geraniol and oleyl alcohol. It is preferable, furthermore, to employ primary, straight chain alcohols. When alcohols having branched chains are employed, the side chains should preferably be relatively short.

As previously indicated, a solvent or suspension medium may be employed in effecting the reaction. By a solvent or suspension medium is meant any liquid which is inert to the reactants and products or does not affect the reaction unfavorably. As examples of such solvent or suspension media, we may mention xylene and toluene.

The temperature employed in carrying out the reaction between the alkali metal alkoxide and the alkali metal B-halogenethanesulphonate may vary within relatively wide limits but in any case should be below the temperature giving rise to decomposition of the products.

The products, viz., the sulpho-acids and alkali metal salts thereof, possess remarkable soap-like properties, are stable to acids and can be used in calcareous or other hard water. Further, they do not suffer decomposition by the action of hydrolytic agencies. It will be understood, of course, that the various products may differ as regards certain characteristics. For instance, the products of all the examples have pronounced soap-like properties but differ in other respects. Thus, the product of Example I is a wetting agent but its detergent power is relatively low. The products of Examples II and III, on the other hand, being those made from alcohols with longer carbon chains have great detergent power. These latter products are especially desirable.

On account of their excellent wetting, detergent, foaming and dispersive properties, the various products have a wide application for a variety of purposes. They are particularly useful in cleansing and scouring baths for textiles.

As many apparent and widely different embodiments of this invention may be made without departing from the spirit thereof, it is to be understood that we do not limit ourselves to the foregoing examples or description except as indicated in the following claims.

We claim:

The process which comprises reacting an aliphatic alcohol containing at least six carbon atoms with sodamide in the presence of an alkylated benzene, and heating the resultant solvent reaction mixture with a sodium beta-halogenethane-sulphonate.

ALFRED WILLIAM BALDWIN.
ANTHONY JAMES HAILWOOD.